United States Patent [19]

Joh

[11] 4,187,180
[45] Feb. 5, 1980

[54] HOLLOW-FIBER PERMEABILITY APPARATUS

[75] Inventor: Yasushi Joh, Yokohama, Japan

[73] Assignee: Nippon Zeon Co. Ltd., Tokyo, Japan

[21] Appl. No.: 840,303

[22] Filed: Oct. 7, 1977

[30] Foreign Application Priority Data

Oct. 18, 1976 [JP] Japan .................. 51-124658

[51] Int. Cl.² ................................. B01D 31/00
[52] U.S. Cl. .................... 210/321 R; 210/321 B; 210/323 T; 210/455
[58] Field of Search ........... 210/321 R, 321 A, 321 B, 210/323 T, 433 M, 456, 455; 55/16, 158; 422/48

[56] References Cited

U.S. PATENT DOCUMENTS

| | | | |
|---|---|---|---|
| 2,312,999 | 3/1943 | DeLangen | 210/153 |
| 3,704,223 | 11/1972 | Dietzsch et al. | 210/22 |
| 3,774,771 | 11/1973 | Manjikian et al. | 210/321 |
| 3,884,814 | 5/1975 | Vogt et al. | 210/321 |
| 4,038,190 | 7/1977 | Baudet et al. | 210/321 B |
| 4,049,765 | 9/1977 | Yamazaki | 264/261 |
| 4,082,670 | 4/1978 | Joh | 210/195 R |
| 4,124,510 | 11/1978 | Joh | 210/321 B |
| 4,125,468 | 11/1978 | Joh et al. | 210/456 |

FOREIGN PATENT DOCUMENTS

| | | | |
|---|---|---|---|
| 528794 | 10/1929 | Fed. Rep. of Germany | 210/323 T |
| 2603560 | 8/1976 | Fed. Rep. of Germany | 210/321 A |
| 2267138 | 11/1975 | France | 210/321 |
| 50-12395 | 12/1975 | Japan | 210/321 |
| 7602881 | 5/1976 | Netherlands | 210/321 |

*Primary Examiner*—Charles N. Hart
*Assistant Examiner*—David Sadowski
*Attorney, Agent, or Firm*—McDougall, Hersh and Scott

[57] ABSTRACT

In a hollow-fiber permeability apparatus in which a permeating region of a housing contains a bundle of hollow fibers, and materials can selectively permeate through the membranes formed by the permeable walls of the hollow fibers, between a fluid flowing along the exteriors of the hollow fibers, and another fluid flowing along the interiors of the hollow fibers, at least one constricted portion directed to the inside of the housing is formed in the sides of the cross-wise cross section of the permeating region, the cross-wise cross-section being substantially perpendicular to the longitudinal direction of the hollow fibers.

13 Claims, 10 Drawing Figures

HOLLOW-FIBER PERMEABILITY APPARATUS

BACKGROUND OF THE INVENTION

1. Field of the Invention

This invention relates generally to a hollow-fiber permeability apparatus, and more particularly to a hollow-fiber permeability apparatus in which a permeating region of a housing contains a bundle of hollow fibers, and materials can selectively permeate through the membranes formed by the permeable walls of the hollow fibers, between a fluid flowing along the exteriors of the hollow fibers, and another fluid flowing along the interiors of the hollow fibers. The permeation may be based on the principles of osmosis, dialysis, ultrafiltration, reverse osmosis or the like.

2. Description of the Prior Art

For example, a conventional hollow-fiber permeability apparatus is used for hemodialyzer in which toxic materials are removed from the blood of a patient suffering from renal failure or medicinal poisoning. Such apparatus is also used as an artificial lung, in which oxygen and carbon dioxide are exchanged with each other to increase the blood oxygen content. Further, it is used for purification or desalination of water in a reverse osmosis apparatus.

Accordingly, this invention can be most suitably applied to osmosis apparatus, dialysis apparatus, ultrafiltration apparatus and reverse osmosis apparatus, or to combinations of them in which a relatively large effective surface area of membrane is desired for the volume.

In the hemodialyzer metabolic wastes or excess ions permeate through the wall membranes from the blood of a patient to dialysate, and necessary ions permeate through the wall membranes from the dialysate to the blood, on the basis of Donnan's membrane equilibrium due to the concentration differences between the blood and the dialysate, and water is removed from the blood by ultrafiltration.

The conventional hemodialyzers are generally classified into coil-type, plate-type and hollow-fiber type. These types have merits and demerits, respectively.

FIG. 1 shows one example of the conventional hollow-fiber hemodialyzer. In this apparatus 10, the hollow fibers 5 are fixed at the upper and lower end portions of the housing 1 with polyurethane. The cut ends of the hollow fibers 5 are open to compartments formed by upper and lower covers of the housing 1.

Blood 36 from the artery of the patient during dialysis is introduced into the housing 1 through a blood inlet tube 14. While the blood 36 flows through the interiors of the hollow fibers 5, dialysis is effected between the blood 36 and dialysate 35 which flows along the exteriors of the hollow fibers 5. Metabolic wastes such as urea, uric acid and creatinine are removed from the blood 36. The purified blood 36 is discharged through the blood outlet tube 15 from the housing 1, and returned to the vein of the patient. During dialysis, water can be removed from the blood 36 by ultrafiltration. The hollow fibers used in the hemodialyzer as above described provide a relative large effective surface area of membrane for the size of the apparatus. Therefore, the dialyzer of this type can be smaller than the conventional coil-type, or Kiil-type dialyzer. Thus, the blood priming volume of the hollow-fiber dialyzer can be smaller, which is beneficial to the patient during dialysis. The dialyzer is also easier to handle.

Since the hollow-fiber type hemodialyzer has many merits, however, the dialyzer has the following demerits:

As shown in FIG. 1, thousands of the hollow fibers 5 are closely bundled in the permeating region of the cylindrical housing 1. It is difficult that the dialysate 35 can be perfused uniformly through the whole part of the bundle 6. The dialysate 35 flows mainly around the peripheral region of the bundle 6 adjacent to the inner wall of the housing 1, and the dialysis performance is extermely low in the central region of the bundle 6. Most of the housings of the marketted hollow-fiber type dialyzers are cylindrical in shape. The chlindrical housing may be ideal from the viewpoint of the simplicity of construction and of the facility of assembling. However, since numerous hollow fibers, for example, ten thousand hollow fibers are closely bundled in the permeating region, it is impossible to remove the disadvantage that the dialysate cannot be perfused through the central portion of the hollow-fiber bundle. If the diameter of the cylindrical housing is reduced to one third in order to perfuse the central portion of the hollow-fiber bundle with the dialysate, the length of the permeating region, namely that of the hollow fibers should be lengthened three times to maintain the same total membrane area of the hollow fibers. Such an apparatus is not only inconvenient for handling, but also it imposes high pressure loss on the blood introduced.

New types of the dialyzers are disclosed in Japanese Patent Opening Nos. 33888/1977 and 58079/1977 which were filed on Sept. 11, 1975 in Sweden and on Nov. 5, 1975 in U.S.A. respectively. In these dialyzers, the interior of the housing is partitioned into more than two compartments by walls. The compartments each are packed with hollow fiber bundles. Dialysate is introduced from the inlet tube formed at the lower end of the housing, flows up through the first compartment counter-currently to the blood, then it turns at the upper end portion of the compartment to flow down through the second compartment. The dialysate again turns at the lower end portion of the second compartment to flow up through the third compartment. Thus, the dialysate flows up and down in the housing. It is finally discharged from the outlet tube formed at the upper end of the housing. In such apparatus, the dialysate is contaminated with materials from blood after being perfused in the first compartment and further the contaminated dialysate flows through the second, and much more contaminated one flows in the third . . . compartments and so on.

In another example of the above-described patent openings, the dialysate is first perfused upward counter-currently to the blood in the first compartment, then it turns at the upper end portion of the first compartment to flow down through a first channelling route. The dialysate is again perfused upward counter-currently to the blood in the second compartment, and so forth. Therefore, the second and third compartments are perfused with the contaminated dialysate after the first and second compartments perfused, respectively. Accordingly, the apparatus of the above-described patent openings have the demerit that the total dialysis efficiency is deteriorated.

This inventor already proposed a novel hollow-fiber permeability apparatus in the U.S. Pat. No. 4,082,670, issued Apr. 4, 1978 in which the cross section of the permeating region of the housing is flattened or oblong, and dialysate flows uniformly through the whole hollow-fiber bundle counter-currently to the flow of blood, whereby the dialysis efficiency can be improved.

Since then, this inventor has further studied the proposed apparatus, and has invented a further improved hollow-fiber permeability apparatus.

SUMMARY OF THE INVENTION

An object of this invention is to provide a hollow-fiber permeability apparatus (dialyzer) in which a fluid flowing along the exteriors of hollow fibers can be more uniformly perfused through the hollow-fiber bundle, and thereby the permeability efficiency can be more improved.

Another object of this invention is to provide a hollow-fiber dialyzer in which hollow fibers are not localized in the permeating region, but they are uniformly placed in the permeating region, and thereby the dialysis efficiency can be more improved.

A further object of this invention is to provide a hollow fiber dialyzer in which the permeating region can be easily packed with hollow fibers, and thereby high productivity can be improved.

In accordance with one aspect of this invention, in a hollow-fiber permeability apparatus in which a permeating region of a housing contains a bundle of hollow fibers, and materials can selectively permeate through the membranes formed by the permeable walls of the hollow fibers, between a fluid flowing along the exteriors of the hollow fibers, and another fluid flowing along the interiors of the hollow fibers, at least one constricted portion directed to the inside of the housing is formed in the sides of the cross-wise cross section of the permeating region, the cross section being substantially perpendicular to the longitudinal direction of the hollow fibers.

The other objects, features and advantages of this invention will be apparent from the following description taken in conjunction with the accompanying drawings.

DESCRIPTION OF THE PREFERRED EMBODIMENTS

Figure 2:
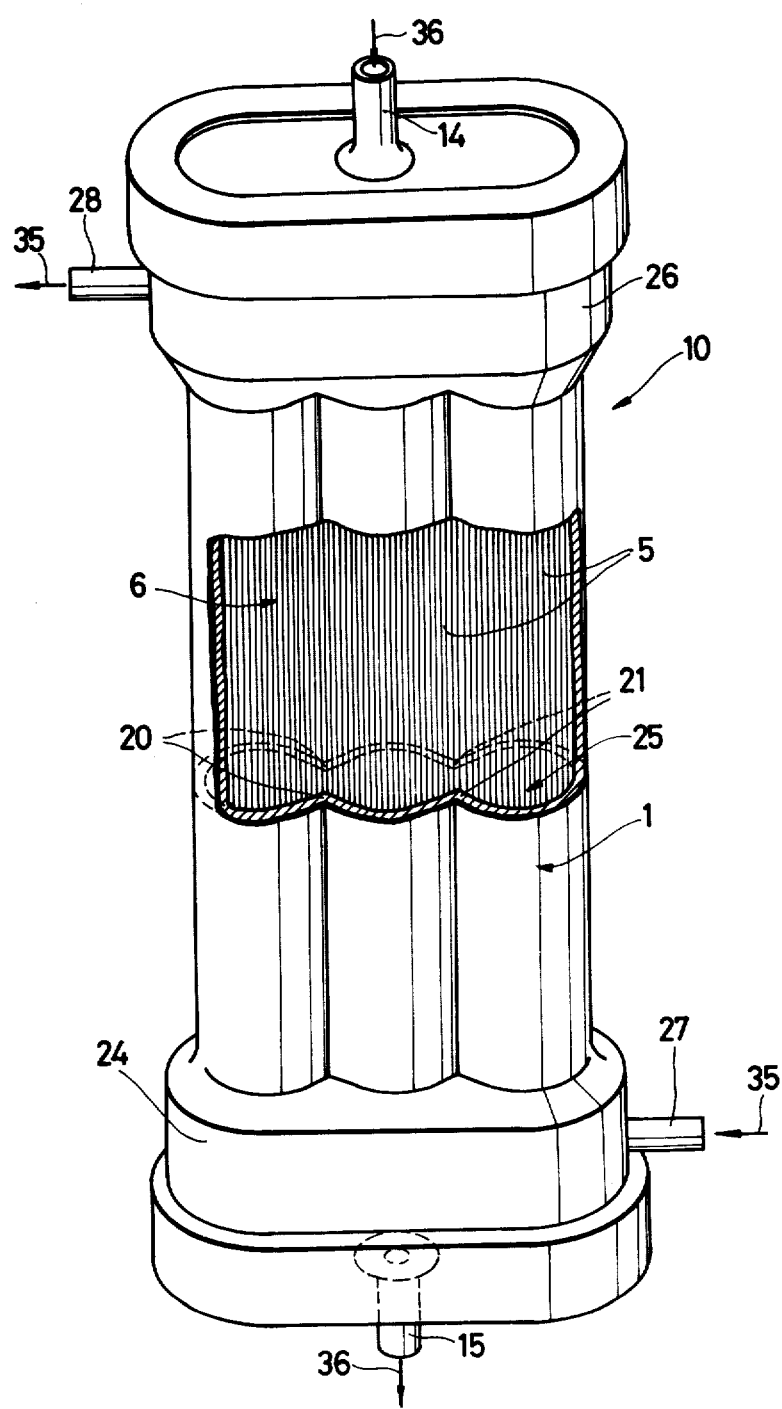
FIG. 2 is a perspective view of a hollow-fiber permeability apparatus according to one embodiment of this invention, partly broken away.

A blood dialyzer according to one embodiment of this invention will be described with reference to FIG. 2 to FIG. 10. FIG. 2 is a perspective view of the dialyzer 10. The cross section of a permeating region 25 of the housing 1 is generally flattened. As clearly shown in FIG. 3, two constricted portions 20 and 21 are symmetrically formed in the opposite longer sides of the cross section of the permeating region 25. The permeating region 25 is uniformly packed with the hollow-fibers 5. Namely, it is packed with one bundle 6, and the permeating region 25 is not separated into compartments, but forms one compartment filled with hollow fibers.

Figure 3:
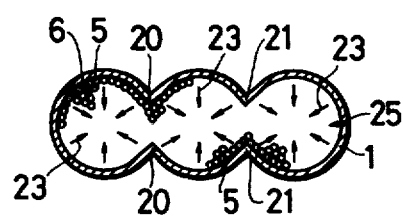
FIG. 3 is a cross-sectional view of the permeating region of the apparatus of FIG. 2.

It will be understood that the dialysate 35 can easily flow through the central portion of the hollow-fiber bundle 6 by function of the constricted portions 20 and 21, as shown by the arrows 23 in FIG. 3. That is the first feature of this invention.

An enlarged cross-section portions 24 and 26 for the introduction of dialysate and for the discharge of dialysate are formed along the whole periphery of the permeating region 25 or along at least opposite longer sides of the cross-section of the permeating region 25 at the lower and upper ends of the housing 1, respectively. Inlet and outlet tubes 27 and 28 for dialysate are combined with the enlarged cross-section portions 24 and 26. In this embodiment, the inlet and outlet tubes 27 and 28 are placed in the opposite sides of the housing, but they may be placed in the same side of the housing. The dialysate 35 is distributed to the whole periphery of the permeating region 25 in the enlarged cross-section portion 24 through the inlet tube 27, and then it flows easily and sufficiently into the central portion of the hollow-fiber bundle 6 occupying the permeating region 25 from the enlarged cross-section portion 24 by function of the constricted portions 20 and 21 of the housing 1, as shown by the arrows in FIG. 3.

The distance between the constricted portion 20 or 21 and the central portion of the hollow-fiber bundle 6 is shorter, and moreover the constricted portions 20 and 21 will urge the dialysate 35 toward the central portion of the hollow-fiber bundle 6. Accordingly, the dialysate 35 can be easily perfused into the central portion of the hollow-fiber bundle 6.

Further, the distance between the opposite constricted portions 20 or 21 is smaller. Accordingly, the flow rate of the dialysate 35 flowing from the inlet enlarged cross-section portion toward the central portion of the hollow-fiber bundle 6 is higher. As the result, the dialysate 35 can be more easily perfused into the central portion of the hollow-fiber bundle 6.

In this embodiment, three imaginary cylindrical regions are defined by the constricted portions 20 and 21. The opposite constricted portions 20 and 21 are not united with each other, respectively. The permeating region is not separated into multi-compartments, but forms one compartment, and the whole permeating region 25 is packed with one hollow-fiber bundle 6.

The second feature of this invention is that the permeating region 25 can be uniformly packed with the hollow fibers 5. If the constricted portions 20 and 21 are not formed in the housing 1, the hollow fibers contained in the permeating region 25 are localized in the assembling process such as the washing process and the potting process for fixing the ends of the hollow-fiber bundle to the housing. During these processes, the packing density of the hollow fibers often becomes uneven. Localized placement of the hollow fibers will develope channelling paths for the dialysate. Thus, the channeling flow of the dialysate occurs due to the uneven packing density in the permeating region 25. The dialysis performance of the dialyzer is deteriorated. It has turned out by the inventor's experiments that the biggest cause of the fluctuation of dialysis performance is due to this unfavorable channelling effect.

In this embodiment, the constricted portions 20 and 21 are formed in the sides of the cross section of the permeating region 25. Accordingly, the hollow fibers 5 are positively supported by the constricted portions 20 and 21 in the assembling process. The constricted portions effectively prevent the hollow fibers 5 from being localized. The whole permeating region 25 can be uniformly packed with the hollow fibers 5. As the result, the dialysis efficiency can be signigicantly improved.

The dialyzer having the secured performance can be manufactured. This is advantage in quality control in the production.

Figure 4:
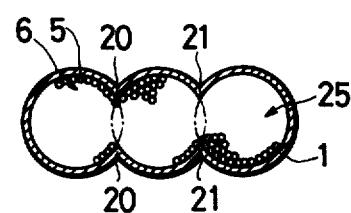
FIG. 4 to FIG. 10 are cross-sectional views of various modifications of the permeating region.

In practice, hollow-fiber bundles having circular cross-sections, which are tied at their ends in the usual manner, may be inserted into the three imaginary cylindrical regions, for example, shown in FIG. 4.

FIG. 4 shows one modification of the permeating region 25. The three imaginary cylindrical regions defined by the constricted portions 20 and 21 overlap with each other, as shown by the dot-dash line in FIG. 4. Actually, these imaginary regions are communicating with each other and constitutes one permeating region 25. As the result, the whole permeating region 25 can be uniformly packed with the hollow fibers 5. The packing operation of the hollow fibers is very easy. Such apparatus is superior in productivity.

Although the constricted portions 20 and 21 are formed in the permeating region 25 of the housing 1, the cross section of the permeating region 25 is generally oblong. Accordingly, in the similar manner to the apparatus of the U.S. Patent Ser. No. 653,351 in which the cross section of the permeating region is oblong, the dialysate from the enlarged cross-section portion 24 is much more easily distributed to the whole of the bundle. In contrast to the apparatus proposed in the Japanese Patent Openings Nos. 33888/77 and 58079/77 in which the permeating region is partitioned into several compartments, the fresh dialysate is introduced to the end portion of the whole hollow fiber bundle from the inlet tube. Then, it flows upwardly through the whole of one hollow-fiber bundle counter-currently to the blood. On the other hand, the apparatus proposed in the above described Japanese Patent Openings have multi-compartments as permeating regions. The dialysate which flows in the second and third compartments is already contaminated when it has passed through the first and second compartments. Compared with these dialyzers, the dialyzer of the present invention has high dialysis efficiency.

Figure 5:
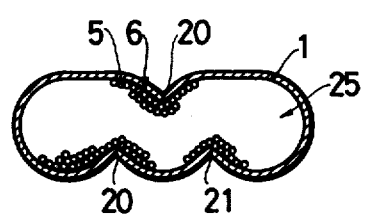
Figure 6:
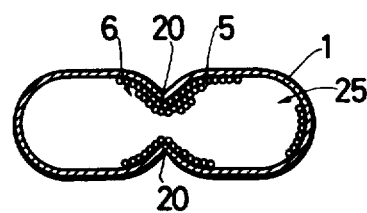
Figure 7:
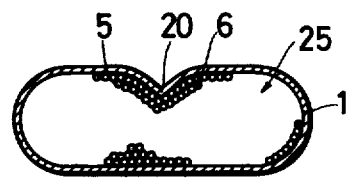

FIG. 5 to FIG. 7 show other modifications of the permeating region 25. In the permeating region 25 of FIG. 5, one constricted portion 20 is formed in the center of the one longer side of the cross section, and two constricted portions 20 and 21 are formed symmetrically with respect to the constricted portion 20 in the other longer side of the cross section. In the permeating region 25 of FIG. 6, the constricted portions 20 are symmetrically formed in the opposite longer sides of the cross section. And in the permeating region 25 of FIG. 7, one constricted portion 20 is formed only in the one longer side of the cross section.

Figure 8:
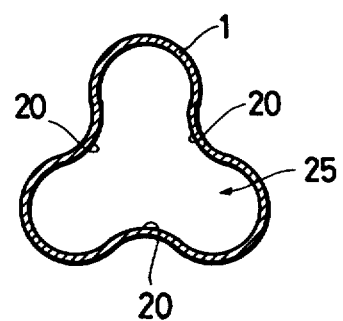
Figure 9:
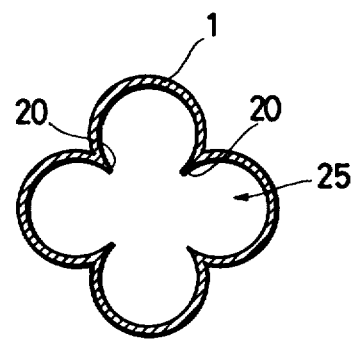
Figure 10:
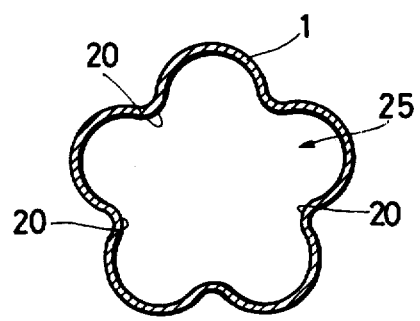

The cross sections of the permeating regions 25 of FIG. 3 to FIG. 7 are flattened or oblong. However, this invention is not limited to the oblong cross section. FIG. 8 to FIG. 10 show further modifications of the permeating region 25 whose cross sections are not flattened or oblong.

The cross section of the permeating region 25 of FIG. 8 is generally triangular. Three constricted portions 20 are formed in the sides of the cross section. The cross section of the permeating region 25 of FIG. 9 is generally square. Four constricted portions are formed. The cross section of the permeating region 25 of FIG. 10 is pentagonal. Five constricted portions are formed.

The constricted portions 20 and 21 do not need to be sharpened (FIG. 3 to FIG. 7 and FIG. 9). They may be rounded (FIG. 8 and FIG. 10).

In short, the gist of this invention is that at least one constricted portion is formed in the sides of the cross section of the permeating region 25. By this invention, the defect that the dialysate is hard to flow into the central portion of the hollow-fiber bundle can be removed.

The number of the constricted portions is preferably 1 to 12, and more preferably 3 to 6. When the number of the constricted portions is more than 12, the efficiency of the packing operation is rather lowered. The depth of the constricted portion does not always need to be constant. However, it may gradually varied in the longitudinal direction of the hollow-fiber bundle.

Figure 1:
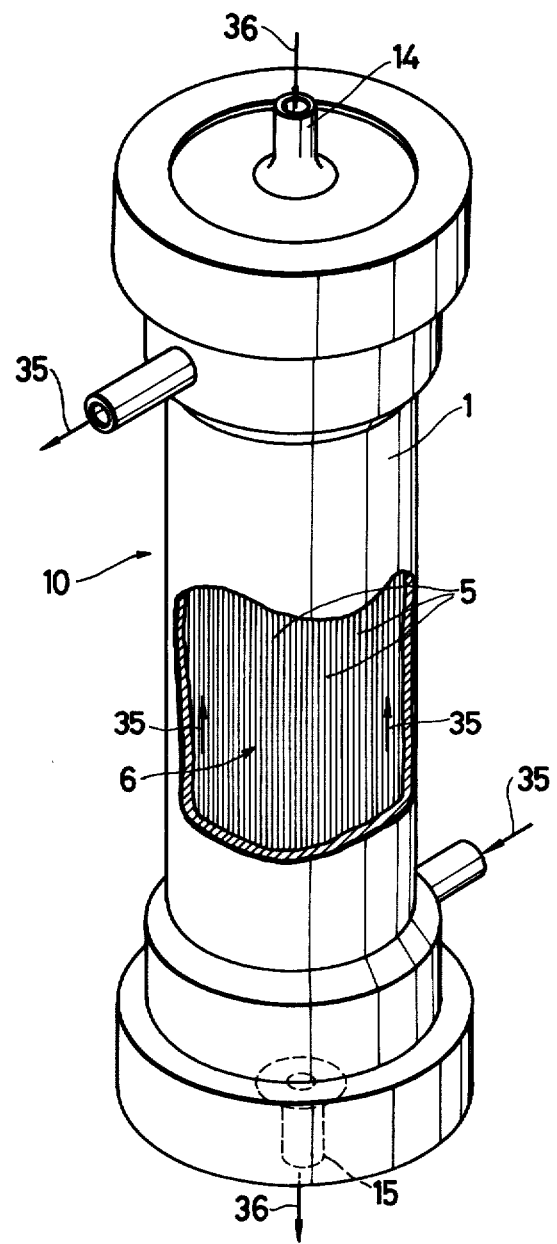
FIG. 1 is a perspective view of a conventional hollow-fiber dialyzer, partly broken away.

The ends of the hollow fibers 5 are fixed to the housing 1 with the potting material such as polyurethane, and the apparatus is assembled in the conventional manner. For the permeating regions shown in FIG. 8 to FIG. 10, the end portions of the housing 1 may be manufactured in the cylindrical shape. Covers may be screwed to the end portions of the housing in the same manner as the conventional cylindrical hollow-fiber dialyzer of FIG. 1.

The embodiment has been described as used for dialysis between two liquids. Embodiment of the invention may be applied to the movement of material between liquid and gas, or between gas and gas through the hollow fiber membranes. Moreover, such embodiment may be used not only as a blood dialyzer, but also for blood oxygen addition apparatus as an artificial lung, in which the blood flows along the inside of the hollow fibers, while the gas or the liquid containing oxygen flows along the outside of the hollow fibers. Also embodiment may be used for disalination and purification of water by reverse osmosis, manufacturing processes for foods such as condensation of juice, removal of yeast in beer, and so on.

Next, the dialysis performance obtained by the above described apparatus will be described with reference to experimental results.

The experimental conditions are as follows:

Hollow Fibers

Kind: Cellulose
Outer diameter: 247 $\mu$m (dry)
Inner diameter: 215 $\mu$m (dry)
Effective length: 200 mm
Number of fibers: 8900
Total membrane area of bundle of hollow fibers: 1.2 $m^2$

Housing

Cross-section taken along the direction perpendicular to the length of the hollow fibers:
15 $cm^2$
Packing density of hollow fibers (volume of hollow fibers swelled with dialysate relative to volume of permeating region to be charged with hollow fibers);
41 volume percent The dialysance D (as defined by Wolff), is represented by the following formula:

$$Db = Qb(Cbi - Cbo/Cbi - Cdi),$$

where Db represents a dialysance for blood, Qb a flow rate of blood, Cbi a concentration of the blood at the inlet opening, Cdi a concentration of the dialysate at the inlet opening, and Cbo a concentration of the blood at the outlet opening.

A solution containing urea, creatinine and vitamin B₁₂, as pseudo-blood was flowed through the interiors of the hollow fibers 5 at the rate of Qb=200 ml/min, while pure water as dialysate was flowed counter-currently through the exterior of the hollow fibers at the rate of Qd=500 ml/min. The results are shown in Table.

TABLE

|  | Dialysance (ml/min) | | |
| --- | --- | --- | --- |
|  | Urea | Creatinine | Vitamin $B_{12}$ |
| Conventional apparatus | 125 | 108 | 21 |
| Apparatus having cross section of FIG. 5 | 158 | 137 | 33 |
| Apparatus having cross section of FIG. 6 | 146 | 130 | 32 |
| Apparatus having cross section of FIG. 9 | 170 | 141 | 34 |
| Apparatus having cross section of FIG. 8 (End portions are Cylindrical) | 165 | 137 | 32 |
| Apparatus having cross section of FIG. 3 | 169 | 143 | 35 |

It will be understood from the above Table that the apparatus according to this invention is superior in dialysis efficiency.

According to this invention, described as above a fluid flowing along the exteriors of the hollow fibers is urged toward the central portion of the hollow-fiber bundle by function of at least one constricted portion formed in the sides of the cross section of the permeating region for the hollow-fiber bundle. Accordingly, the fluid can uniformly flow through the whole hollow-fiber bundle. The dialysis efficiency can be further improved.

While the preferred embodiment has been described, variations thereto will occur to those skilled in the art within the scope of the present inventive concepts which are delineated by the following claims.

What is claimed is:

1. In a hollow-fiber permeability apparatus in which a permeating region of a housing comprises one compartment containing a bundle of hollow fibers, and wherein materials selectively permeate through the membranes formed by the permeable walls of said hollow fibers with a first fluid flowing along the exteriors of said hollow fibers and a second fluid flowing along the interiors of said hollow fibers, said apparatus comprising means for fixing both end portions of said hollow fibers to said housing, the walls of the housing extending parallel with said fibers between said end portions, and separate inlet and outlet means for introducing and discharging said first and second fluids, the improvement wherein:

(a) at least one housing wall includes at least one portion formed inwardly toward an opposing housing wall to define at least one inwardly formed constriction, the constriction extending in the longitudinal direction of said hollow fibers and extending substantially over the whole length of said permeating region; and (b) said constriction extending inwardly for a distance short of said opposing housing wall whereby said constriction divides said compartment comprising said permeating region into a plurality of sub-regions with each sub-region communicating with an adjacent sub-region, said permeating region being substantially and uniformly filled with said hollow fibers, the communication of the respective sub-regions resulting in contact between the fibers in one sub-region with the fibers of an adjacent sub-region, said first fluid being adapted to flow freely between sub-regions whereby said constriction operates to divert said first fluid into contact with fibers in the central interior portions of the bundle.

2. A hollow-fiber permeability apparatus according to claim 1, wherein said housing wall constitutes a part of a circle in the cross-wise cross section of said permeating region.

3. A hollow-fiber permeability apparatus according to claim 2, wherein said housing wall constitutes a plurality of portions of circles forming said compartments, and a plurality of hollow-fiber bundles having circular cross sections are inserted in said sub-regions, whereby the whole of said permeating region is uniformly packed with said hollow fibers.

4. A hollow-fiber permeability apparatus according to claim 1, in which the number of said constrictions is in the range of 1 to 12.

5. A hollow-fiber permeability apparatus according to claim 4, in which the number of said constrictions is in the range of 3 to 6.

6. A hollow-fiber permeability apparatus according to claim 1, in which said permeating region has a flattened cross-section in the direction substantially perpendicular to the lengthwise direction of said hollow fibers, and said constriction is formed in at least one of the longer sides of said flattened cross-section.

7. A hollow-fiber permeability apparatus according to claim 6, in which at least one said constriction is formed in each of the opposite longer sides of said flattened cross section of the permeating region.

8. A hollow-fiber permeability apparatus according to claim 7, in which the constriction in one of the sides of said cross-wise cross section is faced directly to the constricted portion in the opposite one of the sides of said cross-wise cross section.

9. A hollow-fiber permeability apparatus according to claim 1, in which the cross section of said permeating region is generally triangular.

10. A hollow-fiber permeability apparatus according to claim 1, in which the cross section of said permeating region is polygonal.

11. A hollow-fiber permeability apparatus according to claim 1, in which the depth of said constriction is substantially constant in the longitudinal direction of said hollow fibers.

12. A hollow-fiber permeability apparatus according to claim 1, in which the depth of said constriction be gradually varied in the longitudinal direction of said hollow fibers.

13. A hollow fiber permeability apparatus according to claim 1, in which enlarged cross-section portions for introducing said fluid into said housing and for discharging said fluid from said housing are formed at least along substantially the whole lengths of the longer sides of the cross section of said permeating region at both ends of said housing, and said first fluid flows counter-currently relative to said second fluid in said housing.

* * * * *